US012661675B2

(12) United States Patent
Yamada et al.

(10) Patent No.: US 12,661,675 B2
(45) Date of Patent: Jun. 23, 2026

(54) LIQUID EJECTION DEVICE

(71) Applicant: SEIKO EPSON CORPORATION, Tokyo (JP)

(72) Inventors: Manabu Yamada, Matsumoto (JP); Tomoji Suzuki, Matsumoto (JP); Hiroshi Nose, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 221 days.

(21) Appl. No.: 18/408,628

(22) Filed: Jan. 10, 2024

(65) Prior Publication Data

US 2024/0238822 A1 Jul. 18, 2024

(30) Foreign Application Priority Data

Jan. 13, 2023 (JP) ................................ 2023-003729

(51) Int. Cl.

*B05B 15/52* (2018.01)
*B05B 15/65* (2018.01)
*B05B 15/68* (2018.01)
*B05B 12/02* (2006.01)

(52) U.S. Cl.

CPC .............. *B05B 15/52* (2018.02); *B05B 15/65* (2018.02); *B05B 15/68* (2018.02); *B05B 12/02* (2013.01)

(58) Field of Classification Search

None

See application file for complete search history.

(56) References Cited

U.S. PATENT DOCUMENTS

| | | | | |
|---|---|---|---|---|
| 9,278,538 | B2 * | 3/2016 | Sakamoto | B41J 2/17523 |
| 11,046,094 | B2 * | 6/2021 | Mizawa | B41J 2/16526 |
| 2015/0109396 | A1 * | 4/2015 | Kawamoto | B41J 29/13 347/108 |
| 2018/0093489 | A1 * | 4/2018 | Shirono | B41J 2/1754 |
| 2021/0268816 | A1 * | 9/2021 | Washizawa | B41J 29/02 |
| 2022/0212472 | A1 * | 7/2022 | Hoang | B41J 2/16538 |

FOREIGN PATENT DOCUMENTS

| | | | |
|---|---|---|---|
| JP | H09234877 | A | 9/1997 |
| JP | 2006240119 | A | 9/2006 |
| JP | 2010105341 | A | 5/2010 |

* cited by examiner

*Primary Examiner* — Alejandro Valencia
(74) *Attorney, Agent, or Firm* — CHIP LAW GROUP

(57) ABSTRACT

A liquid ejection device includes: a head including a nozzle surface in which a nozzle is opened, the head being configured to eject liquid from the nozzle; a standby cap that covers the nozzle by coming into contact with the head; a receiving unit that receives the liquid ejected from the nozzle; and a maintenance unit that performs maintenance of the head. The head moves in a first area, a second area, and a printing area by moving in a scanning direction, and performs printing on a medium by ejecting the liquid onto the medium while moving in the printing area. The printing area is located between the first area and the second area in the scanning direction. The standby cap and the accommodation unit are located in the first area. The maintenance unit is located in the second area.

8 Claims, 3 Drawing Sheets

LIQUID EJECTION DEVICE

The present application is based on, and claims priority from JP Application Serial Number 2023-003729, filed Jan. 13, 2023, the disclosure of which is hereby incorporated by reference herein in its entirety.

BACKGROUND

1. Technical Field

The present disclosure relates to a liquid ejection device.

2. Related Art

JP-A-2006-240119 describes a liquid ejection device including a head that ejects liquid, a maintenance unit that performs maintenance of the head, a receiving unit that receives the liquid from the head, and a standby cap that comes into contact with the head. The head performs printing on a medium by scanning the medium. In this case, the head moves in a first area, a second area, and a printing area. The head performs printing on the medium by ejecting liquid onto the medium in the printing area.

In the liquid ejection device described in JP-A-2006-240119, the standby cap is located in the first area, and the maintenance unit and the receiving unit are located in the second area. The maintenance unit tends to increase in size as compared to the standby cap and the receiving unit. Therefore, when the receiving unit is located in an area in which the maintenance unit is located, a space within the device may not be effectively utilized.

SUMMARY

A liquid ejection device that solves the above problem includes: a head including a nozzle surface in which a nozzle is opened, the head being configured to eject liquid from the nozzle, a standby cap configured to cover the nozzle by coming into contact with the head, a receiving unit configured to receive the liquid ejected from the nozzle, and a maintenance unit configured to perform maintenance of the head, in which the head moves in a first area, a second area, and a printing area by moving in a scanning direction, and performs printing on a medium by ejecting the liquid onto the medium while moving in the printing area, the printing area is located between the first area and the second area in the scanning direction, the standby cap and the receiving unit are located in the first area, and the maintenance unit is located in the second area.

DESCRIPTION OF EMBODIMENTS

Hereinafter, an embodiment of a liquid ejection device will be described with reference to the drawings. The liquid ejection device is, for example, an inkjet printer that prints images such as text and photographs by ejecting ink, which is an example of liquid, onto a medium such as paper or cloth.

Liquid Ejection Device

Figure 1:
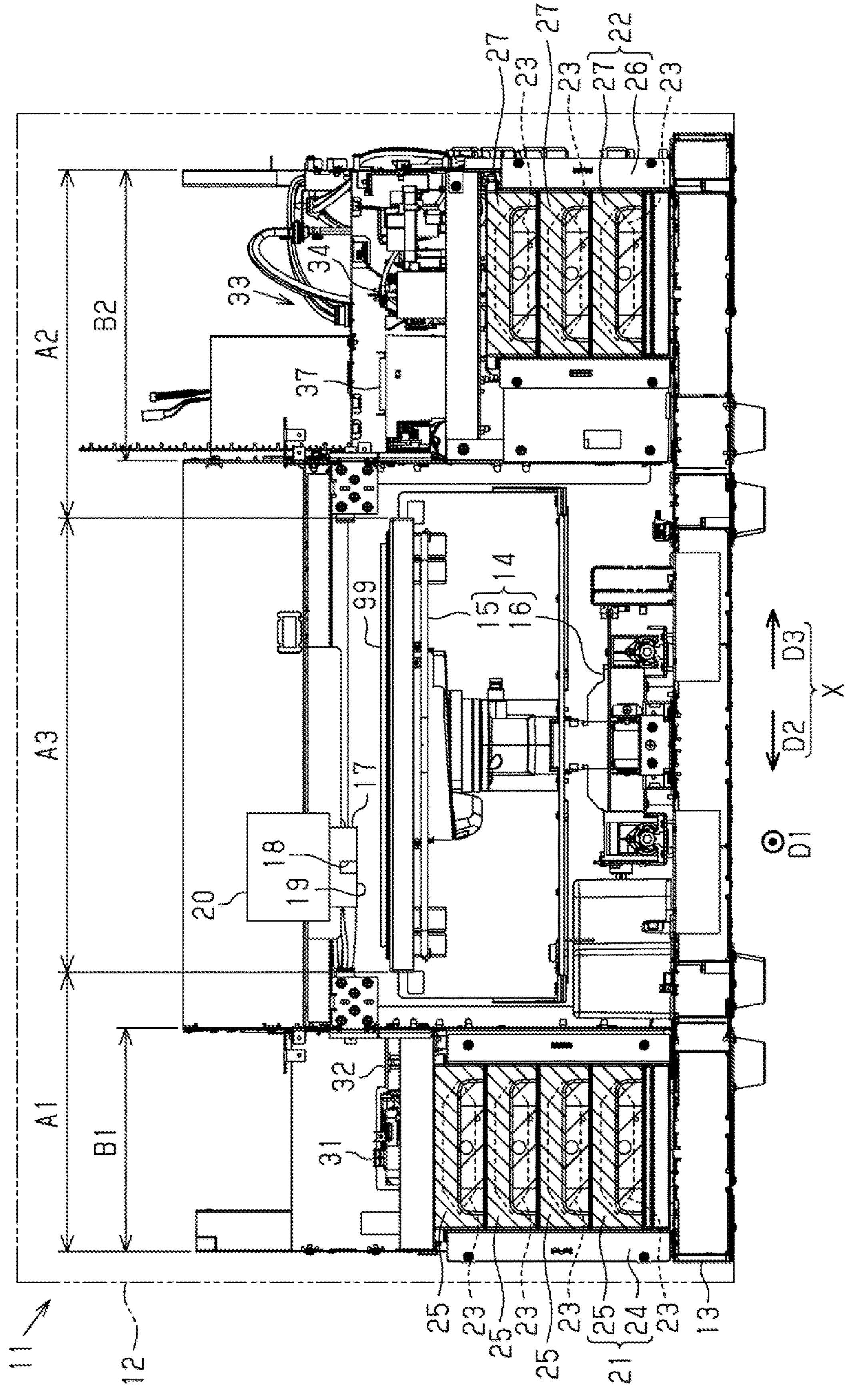
FIG. 1 is a front view illustrating an embodiment of a liquid ejection device.
Figure 2:
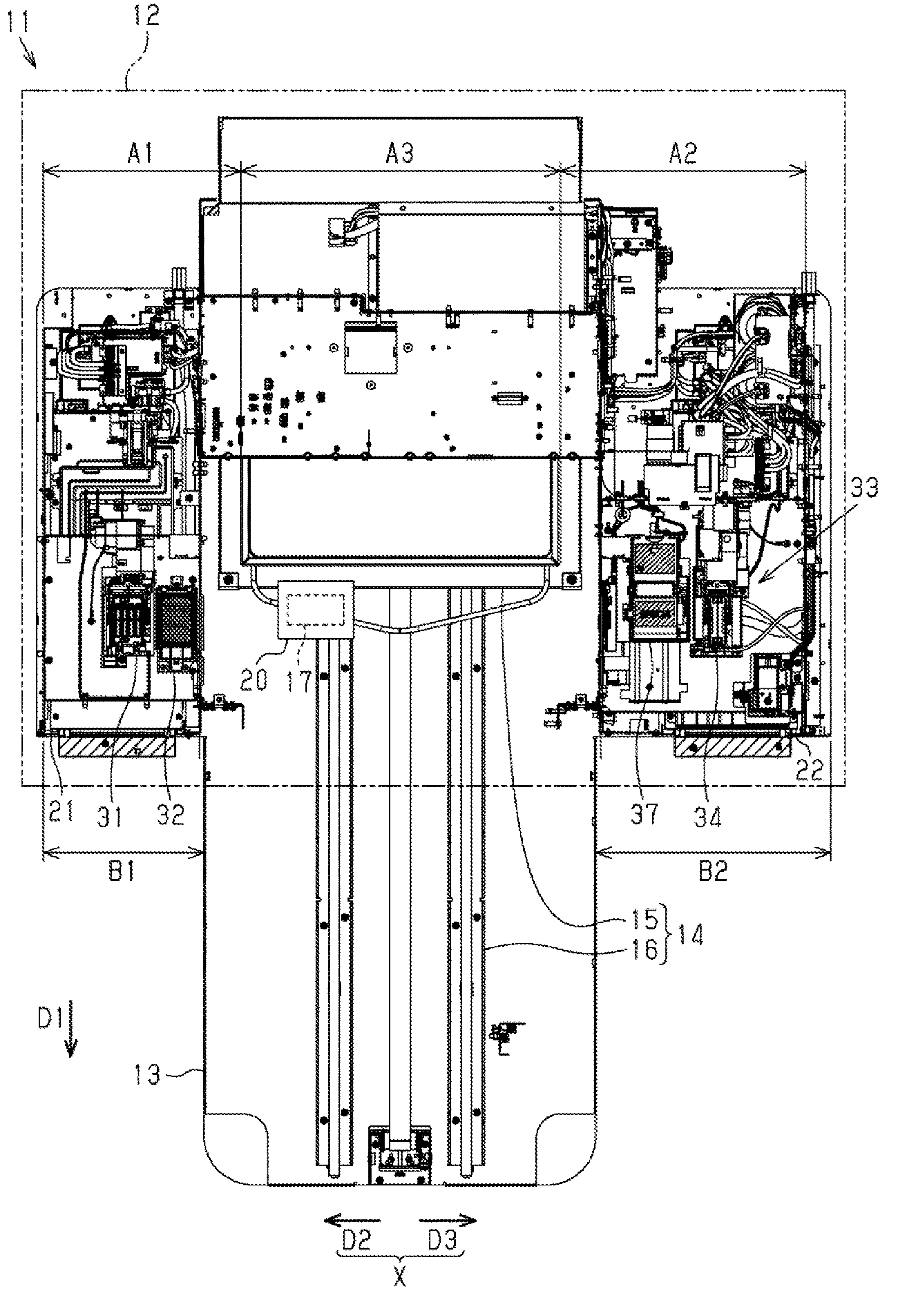
FIG. 2 is a top view of the liquid ejection device.

As illustrated in FIGS. 1 and 2, the liquid ejection device 11 includes a housing 12 and a base frame 13. The housing 12 is attached to the base frame 13.

The liquid ejection device 11 includes a support unit 14. The support unit 14 is configured to support a medium 99. The support unit 14 is attached to the base frame 13. The support unit 14 includes, for example, a support stand 15 and a moving mechanism 16.

The support stand 15 is a stand that supports the medium 99. The support stand 15 is coupled to a moving mechanism 16. The moving mechanism 16 is a mechanism that moves the support stand 15. The moving mechanism 16 is attached to the base frame 13. The moving mechanism 16 moves the support stand 15 in one direction. This causes the medium 99 to move in one direction. In one example, the support unit 14 moves the medium 99 in a first direction D1. The support unit 14 may be configured to support the medium 99 that is conveyed in the first direction D1. For example, the support unit 14 may support the medium 99 that is conveyed in the first direction D1 by a roller.

The liquid ejection device 11 includes a head 17. The head 17 includes a nozzle surface 19 in which one or more nozzles 18 are opened. The head 17 is configured to eject liquid from the nozzles 18.

The head 17 is configured to move in a scanning direction X. The scanning direction X indicates two directions including a second direction D2 and a third direction D3. The second direction D2 is a direction different from the first direction D1. The third direction D3 is a direction opposite to the second direction D2. The head 17 ejects the liquid onto the medium 99 while moving in the scanning direction X, thereby performing printing on the medium 99. Therefore, the liquid ejection device 11 is a serial printer capable of performing printing over an entire width of the medium 99 by the head 17 scanning the medium 99.

The head 17 moves in the scanning direction X, thereby moving in a first area A1, a second area A2, and a printing area A3. The first area A1, the second area A2, and the printing area A3 are all areas within the housing 12. The first area A1, the second area A2, and the printing area A3 are areas obtained by dividing a space within the device in the scanning direction X.

The first area A1 and the second area A2 are areas located at both ends in the scanning direction X within the housing 12. The first area A1 and the second area A2 are areas outside the printing area A3 within the housing 12.

The printing area A3 is an area in which an image is printed on the medium 99. In the printing area A3, the head 17 ejects the liquid onto the medium 99 while moving in the second direction D2 and the third direction D3. In the printing area A3, the medium 99 moves in the first direction D1. The printing area A3 is an area located between the first area A1 and the second area A2 in the scanning direction X. In the printing area A3, the head 17 faces the support unit 14. Specifically, in the printing area A3, the nozzle surface 19 faces the support stand 15.

The head 17 moves through an acceleration and deceleration area by moving in the scanning direction X. In one example, the head 17 moves through a first acceleration and deceleration area B1 and a second acceleration and deceleration area B2. The acceleration and deceleration area is an area in which the head 17 accelerates and decelerates for printing. The head 17 moves alternately in the second direction D2 and the third direction D3 at the time of printing. The head 17 accelerates and decelerates when switching between directions of movement.

The acceleration and deceleration area is located outside the printing area A3. Accordingly, the head 17 can eject liquid onto the medium 99 while moving in the printing area A3 at a constant speed. The head 17 moves at the constant speed, thereby improving the accuracy of landing of the liquid on the medium 99. When the acceleration and deceleration area is located within the printing area A3, the head 17 ejects the liquid onto the medium 99 while accelerating or decelerating, and thus the landing accuracy of the liquid on the medium 99 tends to deteriorate.

The first acceleration and deceleration area B1 is located within the first area A1. Specifically, the first acceleration and deceleration area B1 is included in the first area A1. Accordingly, the first area A1 is effectively utilized. In the first acceleration and deceleration area B1, the head 17 switches a direction of movement from the second direction D2 to the third direction D3. The second acceleration and deceleration area B2 is located within the second area A2. Specifically, the second acceleration and deceleration area B2 is included in the second area A2. Accordingly, the second area A2 is effectively utilized. In the second acceleration and deceleration area B2, the head 17 switches the direction of movement from the third direction D3 to the second direction D2.

The liquid ejection device 11 includes a carriage 20. The carriage 20 includes the head 17 mounted thereon. The carriage 20 is configured to move in the scanning direction X. As the carriage 20 moves, the head 17 moves.

The liquid ejection device 11 includes one or more mounting units. In one example, the liquid ejection device 11 includes a first mounting unit 21 and a second mounting unit 22. The mounting units are configured such that one or more liquid reservoirs 23 can be mounted to the mounting units. In one example, a plurality of liquid reservoirs 23 are mounted to the first mounting unit 21 and the second mounting unit 22, respectively. In the mounting unit, for example, a plurality of liquid reservoirs 23 are mounted overlapping vertically. That is, the liquid reservoirs 23 are mounted in a plurality of stages in the mounting unit.

The liquid reservoir 23 is configured to accommodate liquid. The liquid reservoir 23 is, for example, a pack that stores liquid. When the liquid reservoir 23 is mounted to the mounting unit, liquid is supplied from the liquid reservoir 23 to the liquid ejection device 11. For example, when the liquid reservoir 23 is mounted to the mounting unit, the liquid is supplied from the liquid reservoir 23 to the head 17. When the liquid reservoir 23 is mounted to the mounting unit, the liquid may be supplied from the liquid reservoir 23 to a configuration different from the head 17. For example, when the liquid reservoir 23 is mounted to the mounting unit, the liquid may be supplied from the liquid reservoir 23 to a maintenance unit 33, which will be described below.

A type of liquid stored in the liquid reservoir 23 is not limited to a type of liquid ejected by the head 17. For example, the liquid reservoir 23 may store a cleaning liquid for cleaning the maintenance unit 33. In one example, the plurality of liquid reservoirs 23 mounted to the mounting unit include a liquid reservoir 23 that accommodates ink and a liquid reservoir 23 that accommodates cleaning liquid.

The mounting unit is attached to the base frame 13. The first mounting unit 21 and the second mounting unit 22 are located so that the support unit 14 is interposed therebetween in the scanning direction X.

The first mounting unit 21 is located in the second direction D2 relative to the support unit 14. At least a portion of the first mounting unit 21 is located in the first area A1. In one example, the entire first mounting unit 21 is located in the first area A1. The first mounting unit 21 may be located over the first area A1 and the printing area A3. The first mounting unit 21 is located in the first area A1, so that the first area A1 is effectively utilized by the first mounting unit 21. The first mounting unit 21 may be located in the first acceleration and deceleration area B1. Accordingly, the first acceleration and deceleration area B1 is effectively utilized by the first mounting unit 21.

The second mounting unit 22 is located further in the third direction D3 relative to the support unit 14. At least a portion of the second mounting unit 22 is located in the second area A2. In one example, the entire second mounting unit 22 is located in the second area A2. The second mounting unit 22 may be located over the second area A2 and the printing area A3. The second mounting unit 22 is located in the second area A2, so that the second area A2 is effectively utilized by the second mounting unit 22. The second mounting unit 22 may be located in the second acceleration and deceleration area B2. Accordingly, the second acceleration and deceleration area B2 is effectively utilized by the second mounting unit 22.

The number of liquid reservoirs 23 that can be mounted to the first mounting unit 21 is larger than the number of liquid reservoirs 23 that can be mounted to the second mounting unit 22. Therefore, a proportion of the space within the device occupied by the first mounting unit 21 is higher than a proportion of the space within the device occupied by the second mounting unit 22. Therefore, the first mounting unit 21 occupies a relatively large portion of the first area A1.

The mounting unit includes a mounting body and one or more cassettes. The first mounting unit 21 includes a first mounting body 24, and one or more first cassettes 25. The second mounting unit 22 includes a second mounting body 26, and one or more second cassettes 27. The mounting body is attached to the base frame 13. The cassette is mounted to the mounting body. The cassette can be inserted into and removed from the mounting body. The liquid reservoir 23 can be accommodated in the cassette. When the cassette accommodating the liquid reservoir 23 is mounted to the mounting body, the liquid reservoir 23 is mounted to the mounting unit. The mounting unit may be configured such that the liquid reservoir 23 can be directly mounted to the mounting unit.

The first mounting unit 21 includes four first cassettes 25. That is, four liquid reservoirs 23 can be mounted to the first mounting unit 21. Four liquid reservoirs 23 accommodating color ink for printing are mounted to the first mounting unit 21. For example, four liquid reservoirs 23 that store cyan, magenta, yellow, and black inks, respectively, are mounted to the first mounting unit 21.

The second mounting unit 22 includes three second cassettes 27. That is, three liquid reservoirs 23 can be mounted to the second mounting unit 22. Two liquid reservoirs 23 that each store white ink for a base, and a liquid reservoir 23 that stores cleaning liquid are mounted to the second mounting unit 22. Of the three liquid reservoirs 23 mounted to the second mounting unit 22, the liquid reservoir 23 located at the bottom stage stores the cleaning liquid.

The liquid ejection device 11 includes a standby cap 31. The standby cap 31 covers the nozzles 18 by coming into contact with the head 17. Specifically, the standby cap 31 forms a space communicating with the nozzles 18 by coming into contact with the nozzle surface 19. Accordingly, the nozzles 18 are moisturized. Moisturizing the nozzles 18 reduces the possibility of the nozzles 18 being clogged.

The standby cap 31 is located in the first area A1. The standby cap 31 may be located in the first acceleration and deceleration area B1. The standby cap 31 is located above the first mounting unit 21. The standby cap 31 comes into contact with the head 17 when the head 17 does not perform the printing. That is, the head 17 is located at a position facing the standby cap 31 when the head 17 does not perform the printing. Therefore, the position facing the standby cap 31 is a home position of the head 17. The head 17 usually stands by at the home position. The standby cap 31 comes into contact with the head 17 located at the home position.

The liquid ejection device 11 includes a receiving unit 32. The receiving unit 32 is configured to receive the liquid ejected from the head 17. Specifically, the receiving unit 32 receives the liquid ejected from the nozzles 18 by flushing. Flushing is an operation of appropriately ejecting liquid that does not contribute to printing before, during, and after printing. By flushing, thickened liquid, air bubbles, or the like is discharged from the nozzles 18. Accordingly, the ejection performance of the head 17 is maintained. The receiving unit 32 includes, for example, a tray, a box, a cap, or a porous member for receiving liquid.

The receiving unit 32 is located in the first area A1. The receiving unit 32 may be located in the first acceleration and deceleration area B1. The receiving unit 32 is located above the first mounting unit 21. The receiving unit 32 is located between the standby cap 31 and the support unit 14 in the scanning direction X. The receiving unit 32 is located between the standby cap 31 and the maintenance unit 33 in the scanning direction X. Therefore, the standby cap 31 and the receiving unit 32 are arranged in this order in the third direction D3. The head 17 executes flushing before printing. That is, the head 17 moves from the standby cap 31 toward the receiving unit 32 at the start of printing. Therefore, when the standby cap 31 and the receiving unit 32 are arranged in this order in the third direction D3, the head 17 approaches the printing area A3 by moving from the standby cap 31 toward the receiving unit 32. Accordingly, printing is started efficiently.

The liquid ejection device 11 includes the maintenance unit 33. The maintenance unit 33 is configured to perform maintenance of the head 17. The maintenance unit 33 maintains or restores the ejection performance of the head 17 by performing maintenance of the head 17. The maintenance unit 33 is located in the second area A2. The maintenance unit 33 may be located in the second acceleration and deceleration area B2. The maintenance unit 33 is located above the second mounting unit 22.

Figure 3:
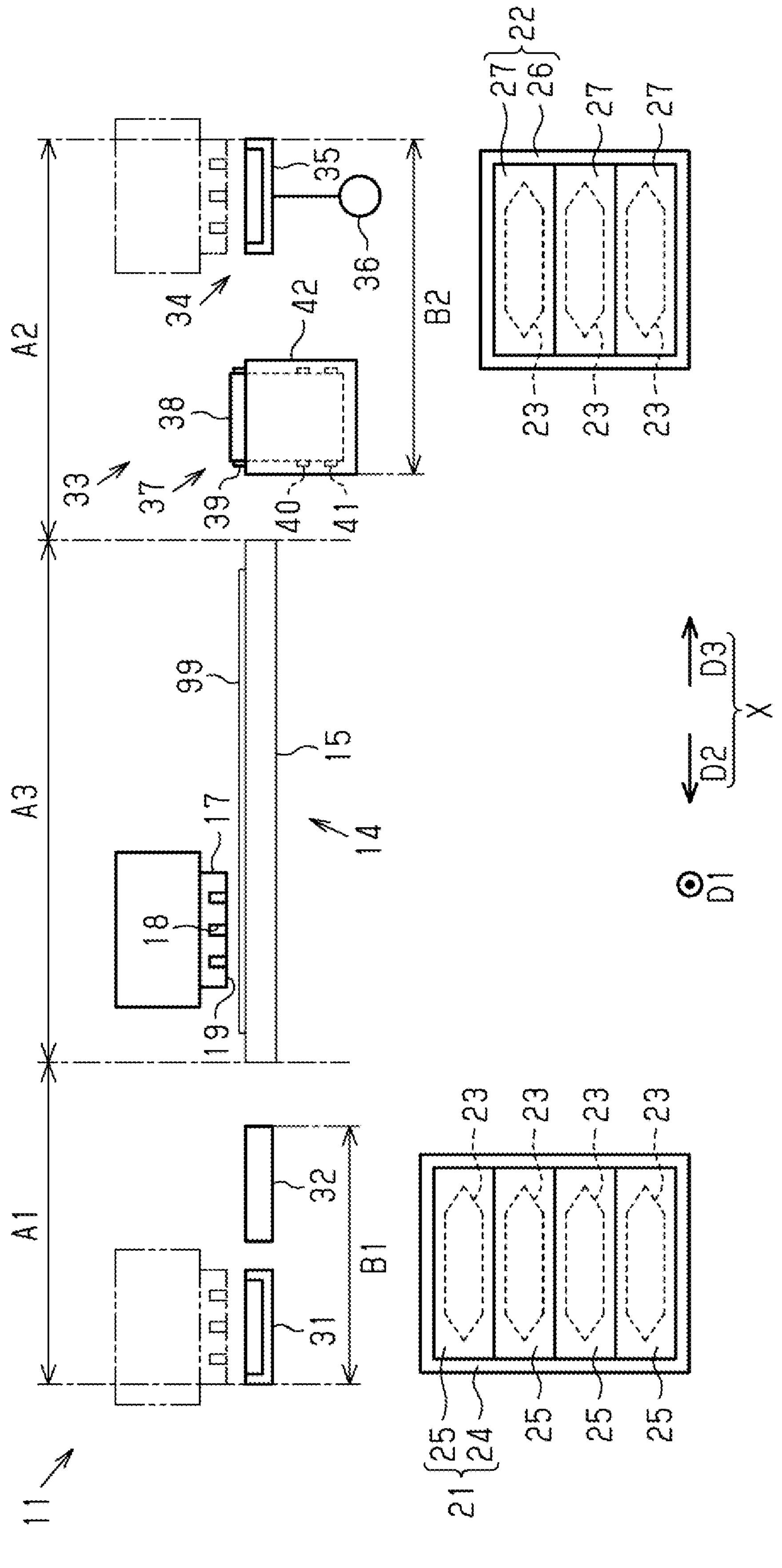
FIG. 3 is a front view schematically illustrating the liquid ejection device.

As illustrated in FIG. 3, the maintenance unit 33 includes a cleaning unit 34. The cleaning unit 34 performs maintenance of the head 17 by cleaning the head 17. The cleaning is an operation of discharging air bubbles, thickened liquid, foreign matter, or the like from within the head 17 along with the liquid by forcibly discharging the liquid from the nozzles 18. The cleaning unit 34 performs suction from the nozzles 18 to forcibly discharge the liquid from the nozzles 18. The cleaning unit 34 cleans the head 17 after the head 17 completes the printing.

The cleaning unit 34 includes a suction cap 35 and a suction pump 36. The suction cap 35 covers the nozzles 18 by coming into contact with the head 17. Specifically, the suction cap 35 forms a space communicating with the nozzles 18 by coming into contact with the nozzle surface 19. The suction pump 36 is coupled to the suction cap 35. The suction pump 36 sucks the inside of the suction cap 35. The cleaning unit 34 cleans the head 17 by the suction pump 36 sucking the inside of the suction cap 35 in a state in which the suction cap 35 covers the nozzles 18.

The cleaning unit 34 may be configured to supply cleaning liquid to the suction cap 35. After cleaning, the liquid may remain in the suction cap 35. In this case, there is concern that the liquid remaining in the suction cap 35 may solidify. When cleaning liquid is supplied to the suction cap 35 after cleaning, the concern that the liquid remains in the suction cap 35 is reduced.

The maintenance unit 33 includes a wiping unit 37. The wiping unit 37 performs maintenance of the head 17 by wiping the nozzle surface 19. The wiping unit 37 removes liquid, foreign matter, or the like adhering to the nozzle surface 19 by wiping the nozzle surface 19. The wiping unit 37 wipes the nozzle surface 19 after the head 17 completes printing. Specifically, the wiping unit 37 wipes the nozzle surface 19 after the cleaning unit 34 cleans the head 17. When the cleaning unit 34 cleans the head 17, the liquid is likely to adhere to the nozzle surface 19 due to the liquid being sucked from the nozzles 18. Therefore, as the wiping unit 37 wipes the nozzle surface 19 after cleaning, the liquid adhering to the nozzle surface 19 due to cleaning can be removed.

The wiping unit 37 is located between the cleaning unit 34 and the support unit 14 in the scanning direction X. The wiping unit 37 is located between the cleaning unit 34 and the receiving unit 32 in the scanning direction X. Therefore, the cleaning unit 34 and the wiping unit 37 are arranged in this order in the second direction D2. The head 17 returns to the home position when the printing is completed. That is, the head 17 moves to the home position after the maintenance. Therefore, when the cleaning unit 34 and the wiping unit 37 are arranged in this order in the second direction D2, the head 17 approaches the standby cap 31 by moving in the second direction D2 from the cleaning unit 34 toward the wiping unit 37. This enables the head 17 to move efficiently.

The wiping unit 37 includes a wiping member 38. The wiping member 38 is a member that comes into contact with the nozzle surface 19. The wiping member 38 is, for example, cloth. When the wiping member 38 comes into contact with the nozzle surface 19, the nozzle surface 19 is wiped.

The wiping unit 37 may include a wrapping unit 39. The wiping member 38 is wrapped around the wrapping unit 39. The wrapping unit 39 is, for example, a roller. The wrapping unit 39 presses the wiping member 38 against the nozzle surface 19. Accordingly, liquid, foreign matter, or the like is effectively removed from the nozzle surface 19.

The wiping unit 37 may include a feeding unit 40. The feeding unit 40 is configured to feed the wiping member 38. The feeding unit 40 feeds the wiping member 38 toward the wrapping unit 39. The feeding unit 40 is, for example, a roller. The unused wiping member 38 is wound around the feeding unit 40. The feeding unit 40 feeds the unused wiping member 38 through rotation. The feeding unit 40 may feed the unused wiping member 38 each time the wiping member 38 wipes the nozzle surface 19. Accordingly, liquid, foreign matter, or the like is effectively removed from the nozzle surface 19.

The wiping unit 37 may include a winding unit 41. The winding unit 41 is configured to wind the wiping member 38. The winding unit 41 winds the wiping member 38 from the wrapping unit 39. The winding unit 41 is, for example, a roller. The used wiping member 38 is wound around the winding unit 41. The winding unit 41 winds the used wiping member 38 through rotation. The winding unit 41 may wind the used wiping member 38 each time the wiping member 38 wipes the nozzle surface 19.

The wiping unit 37 may include a wiping case 42. The wiping case 42 is a case that accommodates the wiping member 38, the wrapping unit 39, the feeding unit 40, and the winding unit 41. The wrapping unit 39 is accommodated in the wiping case 42 so that a portion thereof is exposed. Therefore, a portion of the wiping member 38 that is wrapped around the wrapping unit 39 is exposed from the wiping case 42. The wiping case 42 is configured to move in the first direction D1. The wiping member 38 wipes the nozzle surface 19 by the wiping case 42 moving in the first direction D1. The wiping member 38 may wipe the nozzle surface 19 by the head 17 moving in the first direction D1, instead of the wiping case 42 moving.

The wiping member 38 is not limited to cloth, and may be configured of a resin blade wiper, for example. In this case, there is concern that the liquid removed from the nozzle surface 19 by the wiping member 38 remains. Therefore, the wiping unit 37 may be configured to supply the cleaning liquid to the wiping member 38. When the cleaning liquid is supplied to the wiping member 38 after the wiping member 38 wipes the nozzle surface 19, the concern that liquid remains in the wiping member 38 is reduced.

Layout of First Area and Second Area

The maintenance unit 33 tends to increase in size as compared to the standby cap 31 and the receiving unit 32. This is because configurations of the cleaning unit 34 and the wiping unit 37 are more complex than those of the standby cap 31 and the receiving unit 32. For example, since the cleaning unit 34 and the wiping unit 37 use a motor for driving, the cleaning unit 34 and the wiping unit 37 tends to increase in size. Therefore, the proportion of the maintenance unit 33 in the space within the device tends to be higher than the proportion of the standby cap 31 and the receiving unit 32 in the space within the device. Therefore, the maintenance unit 33 occupies a relatively large portion of the second area A2.

In the liquid ejection device 11, it is necessary to secure the first area A1 and the second area A2 for acceleration and deceleration areas. That is, even when the standby cap 31, the receiving unit 32, and the maintenance unit 33 are all located in the first area A1, it is necessary to secure the second area A2. Therefore, the second mounting unit 22 is located in the second area A2 of which a relatively larger portion is occupied by the maintenance unit 33, so that the space within the device can be effectively utilized. Further, the standby cap 31 and the receiving unit 32 are located in the first area A1 of which a relatively larger portion is occupied by the first mounting unit 21, so that the space within the device is effectively utilized.

Operation and Effects

Next, operation and effects of the above embodiment will be described.

(1) The standby cap 31 and the receiving unit 32 are located in the first area A1. The maintenance unit 33 is located in the second area A2. According to the above configuration, since the standby cap 31 and the receiving unit 32 are located in an area different from the area in which the maintenance unit 33 is located, the space within the device can be effectively utilized. That is, the relatively small standby cap 31 and the receiving unit 32 are located in the first area A1 different from the second area A2 in which the relatively large maintenance unit 33 is located, so that the space within the device can be effectively utilized.

(2) The maintenance unit 33 includes the cleaning unit 34 that performs maintenance of the head 17 by sucking the liquid from the nozzles 18.

According to the above configuration, when the cleaning unit 34 sucks the liquid from the nozzles 18, air bubbles, thickened liquid, and foreign matter are discharged from the nozzles 18 along with the liquid. Accordingly, the ejection performance of the head 17 can be maintained or restored.

(3) The maintenance unit 33 includes the wiping unit 37 that performs maintenance of the head 17 by wiping the nozzle surface 19.

According to the above configuration, the wiping unit 37 wipes the nozzle surface 19 so that liquid, foreign matter, or the like adhering to the nozzle surface 19 is removed. Accordingly, the ejection performance of the head 17 can be maintained or restored.

(4) The number of liquid reservoirs 23 that can be mounted to the first mounting unit 21 is larger than the number of liquid reservoirs 23 that can be mounted to the second mounting unit 22.

The maintenance unit 33 tends to increase in size as compared to the standby cap 31 and the receiving unit 32. Therefore, the proportion of the maintenance unit 33 in the space within the device tends to be higher than the portion of the standby cap 31 and the receiving unit 32 in the space within the device. According to the above configuration, the proportion of the first mounting unit 21 in the space within the device becomes higher than the proportion of the second mounting unit 22 in the space within the device. Therefore, the standby cap 31, the receiving unit 32, and the first mounting unit 21 are located in the first area A1, and the maintenance unit 33 and the second mounting unit 22 are located in the second area A2, so that the space within the device can be effectively utilized.

(5) The receiving unit 32 is located between the standby cap 31 and the maintenance unit 33 in the scanning direction X.

The head 17 usually stands by in a state in which the head 17 is covered by the standby cap 31. The head 17 ejects liquid to the receiving unit 32 when printing starts. That is, the head 17 moves from the standby cap 31 toward the receiving unit 32 at the start of printing. According to the above configuration, the head 17 approaches the printing area A3 by moving from the standby cap 31 toward the receiving unit 32. Therefore, when printing is started, the head 17 can move efficiently.

(6) The wiping unit 37 is located between the cleaning unit 34 and the receiving unit 32 in the scanning direction X.

When the head 17 is cleaned by the cleaning unit 34, liquid adheres to the nozzle surface 19. Therefore, the wiping unit 37 usually wipes the nozzle surface 19 after cleaning. After the wiping unit 37 wipes the nozzle surface 19, the head 17 returns to the standby cap 31. According to the above configuration, the head 17 approaches the standby cap 31 by moving from the cleaning unit 34 toward the wiping unit 37. Therefore, when the head 17 returns to the standby cap 31, the head 17 can move efficiently.

(7) The standby cap 31 and the receiving unit 32 are located in the first acceleration and deceleration area B1. According to the above configuration, the first acceleration and deceleration area B1 can be effectively utilized.

(8) The maintenance unit 33 is located in the second acceleration and deceleration area B2. According to the above configuration, the second acceleration and deceleration area B2 can be effectively utilized.

Modification Examples

The above embodiment can be modified and implemented as follows. The above embodiments and the following modification examples can be implemented in combination with each other within a technically consistent range.

- The plurality of liquid reservoirs 23 mounted to the mounting unit are not limited to being arranged vertically, but may be arranged in the first direction D1 or may be arranged in the second direction D2, for example.
- The liquid reservoir 23 that stores the cleaning liquid may be mounted to the first mounting unit 21.
- The liquid ejected by the head 17 is not limited to ink, but may be a liquid material in which particles of a functional material are dispersed or mixed in liquid, for example. For example, the head 17 may eject a liquid material containing, in a dispersed or dissolved form, a material such as an electrode material or a pixel material used in, for example, the manufacture of a liquid crystal display, an electroluminescent display, and a surface emitting display.

Technical Ideas

Hereinafter, technical ideas and effects thereof ascertained from the above-described embodiments and modification examples will be described.

(A) A liquid ejection device including: a head including a nozzle surface in which a nozzle is opened, the head being configured to eject liquid from the nozzle; a standby cap configured to cover the nozzle by coming into contact with the head; a receiving unit configured to receive the liquid ejected from the nozzle; and a maintenance unit configured to perform maintenance of the head, in which the head moves in a first area, a second area, and a printing area by moving in a scanning direction, and performs printing on a medium by ejecting the liquid onto the medium while moving in the printing area, the printing area is located between the first area and the second area in the scanning direction, the standby cap and the receiving unit are located in the first area, and the maintenance unit is located in the second area. According to the above configuration, since the standby cap and the receiving unit are located in an area different from the area in which the maintenance unit is located, the space within the device can be effectively utilized.

(B) In the liquid ejection device, the maintenance unit may include a cleaning unit configured to perform maintenance of the head by sucking the liquid from the nozzle, and the cleaning unit may include a suction cap configured to cover the nozzle by coming into contact with the head, and a suction pump configured to suck the inside of the suction cap. According to the above configuration, when the cleaning unit sucks the liquid from the nozzle, air bubbles, thickened liquid in the nozzle, and foreign matter are discharged from the nozzle. Accordingly, the ejection performance of the head can be maintained or restored.

(C) In the liquid ejection device, the maintenance unit may include a wiping unit configured to perform maintenance of the head by wiping the nozzle surface, and the wiping unit may include a wiping member configured to come into contact with the nozzle surface, a feeding unit configured to feed the wiping member, and a winding unit configured to wind the wiping member. According to the above configuration, as the wiping unit wipes the nozzle surface with the wiping unit, liquid, foreign matter, or the like adhering to the nozzle surface is removed. Accordingly, the ejection performance of the head can be maintained or restored.

(D) The liquid ejection device may further include a first mounting unit and a second mounting unit to which a liquid reservoir is mountable, the liquid reservoir being configured to store the liquid, in which at least a portion of the first mounting unit may be located in the first area, at least a portion of the second mounting unit may be located in the second area, and the number of the liquid reservoirs mountable to the first mounting unit may be larger than the number of the liquid reservoirs mountable to the second mounting unit. The maintenance unit tends to increase in size as compared to the standby cap and the receiving unit. Therefore, the proportion of the maintenance unit in the space within the device tends to be higher than the portion of the standby cap and the receiving unit in the space within the device. According to the above configuration, the proportion of the first mounting unit in the space within the device becomes higher than the proportion of the second mounting unit in the space within the device. This makes it possible to effectively utilize the space within the device.

(E) In the liquid ejection device, the receiving unit may be located between the standby cap and the maintenance unit in the scanning direction. The head usually stands by in a state in which the head is covered by the standby cap. When the head starts printing, the head ejects the liquid to the receiving unit. That is, the head moves from the standby cap toward the receiving unit at the start of printing. According to the above configuration, the head approaches the printing area by moving from the standby cap toward the receiving unit. Therefore, when printing is started, the head can move efficiently.

(F) In the liquid ejection device, the wiping unit may be located between the cleaning unit and the receiving unit in the scanning direction. When the head is cleaned by the cleaning unit, the liquid adheres to the nozzle surface. Therefore, after cleaning, the wiping unit usually wipes the nozzle surface. After the wiping unit wipes the nozzle surface, the head returns to the standby cap. According to the above configuration, the head approaches the standby cap by moving from the cleaning unit toward the wiping unit. Therefore, when the head returns to the standby cap, the head can move efficiently.

(G) In the liquid ejection device, the first area may include an acceleration and deceleration area that is an area in which the head accelerates and decelerates for printing, and the standby cap and the receiving unit may be located in the acceleration and deceleration area. In a liquid ejection device, an acceleration and deceleration area is used for the head to move in the scanning direction. According to the above configuration, the acceleration and deceleration area included in the first area can be effectively utilized.

(H) In the liquid ejection device, the second area may include an acceleration and deceleration area that is an area in which the head accelerates and decelerates for printing, and the maintenance unit may be located in the acceleration and deceleration area. In the liquid ejection device, the acceleration and deceleration area is used for the head to move in the scanning direction. According to the above configuration, the acceleration and deceleration area included in the second area can be effectively utilized.

What is claimed is:

1. A liquid ejection device comprising:

a head including a nozzle surface in which a nozzle is opened, the head being configured to eject liquid from the nozzle;

a standby cap configured to cover the nozzle by coming into contact with the head;

a receiving unit configured to receive the liquid ejected from the nozzle;

a maintenance unit configured to perform maintenance of the head, wherein the head moves in a first area, a second area, and a printing area by moving in a scanning direction, and performs printing on a medium by ejecting the liquid onto the medium while moving in the printing area, the printing area is located between the first area and the second area in the scanning direction, the standby cap and the receiving unit are located in the first area, the maintenance unit is located in the second area, the maintenance unit includes a cleaning unit, the cleaning unit is configured to perform the maintenance of the head by sucking the liquid from the nozzle, and the cleaning unit is in the second area; and a first mounting unit and a second mounting unit to which a liquid reservoir is mountable, the liquid reservoir being configured to store the liquid, wherein at least a portion of the first mounting unit is located in the first area, the first mounting unit is located vertically below the standby cap and the receiving unit, a plurality of liquid reservoirs is mounted overlapping vertically to the first mounting unit, at least a portion of the second mounting unit is located in the second area, the second mounting unit is located vertically below the maintenance unit, a plurality of liquid reservoirs is mounted overlapping vertically to the second mounting unit, the plurality of liquid reservoirs mounted to the second mounting unit includes a liquid reservoir that accommodates cleaning liquid for cleaning the maintenance unit, a vertical dimension of the standby cap and the receiving unit is smaller than a vertical dimension of the maintenance unit, and a vertical dimension of the first mounting unit is larger than a vertical dimension of the second mounting unit.

2. The liquid ejection device according to claim 1, wherein the cleaning unit includes a suction cap configured to cover the nozzle by coming into contact with the head, and a suction pump configured to suck an inside of the suction cap.

3. The liquid ejection device according to claim 2, wherein the maintenance unit includes a wiping unit configured to perform the maintenance of the head by wiping the nozzle surface, and the wiping unit includes a wiping member configured to come into contact with the nozzle surface, a feeding unit configured to feed the wiping member, and a winding unit configured to wind the wiping member.

4. The liquid ejection device according to claim 1, wherein a number of the plurality of liquid reservoirs mountable to the first mounting unit is larger than a number of the plurality of liquid reservoirs mountable to the second mounting unit.

5. The liquid ejection device according to claim 1, wherein the receiving unit is located between the standby cap and the maintenance unit in the scanning direction.

6. The liquid ejection device according to claim 3, wherein the wiping unit is located between the cleaning unit and the receiving unit in the scanning direction.

7. The liquid ejection device according to claim 1, wherein the first area includes an acceleration and deceleration area, the acceleration and deceleration area being an area in which the head accelerates and decelerates for the printing, and the standby cap and the receiving unit are located in the acceleration and deceleration area.

8. The liquid ejection device according to claim 1, wherein the second area includes an acceleration and deceleration area, the acceleration and deceleration area being an area in which the head accelerates and decelerates for the printing, and the maintenance unit is located in the acceleration and deceleration area.

* * * * *